United States Patent
Trim et al.

(10) Patent No.: US 11,983,644 B2
(45) Date of Patent: May 14, 2024

(54) INSIGHT ALLOTMENT TO EDGED LOCATIONS

(71) Applicant: International Business Machines Corporation, Armonk, NY (US)

(72) Inventors: Craig M. Trim, Ventura, CA (US); Timothy Davis, Upton, MA (US); Gandhi Sivakumar, Bentleigh (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 17/106,237

(22) Filed: Nov. 30, 2020

(65) Prior Publication Data

US 2022/0172078 A1    Jun. 2, 2022

(51) Int. Cl.
*G06N 5/04*    (2023.01)
*G06N 20/00*   (2019.01)
*H04W 24/02*   (2009.01)

(52) U.S. Cl.
CPC .............. *G06N 5/04* (2013.01); *G06N 20/00* (2019.01); *H04W 24/02* (2013.01)

(58) Field of Classification Search
None
See application file for complete search history.

(56) References Cited

U.S. PATENT DOCUMENTS

| 10,595,167 | B2 | 3/2020 | Chen et al. | |
| 10,599,205 | B2 * | 3/2020 | He | G06N 20/10 |
| 10,608,928 | B2 | 3/2020 | Zhang | |
| 10,681,728 | B2 | 6/2020 | Lee et al. | |
| 11,234,204 | B2 * | 1/2022 | Ding | G07C 5/008 |
| 11,290,561 | B2 * | 3/2022 | Shim | H04L 63/0876 |
| 11,330,511 | B2 * | 5/2022 | Chaysinh | H04L 65/1016 |
| 11,399,376 | B2 * | 7/2022 | Suzaki | H04W 72/542 |

(Continued)

FOREIGN PATENT DOCUMENTS

WO    2014113367 A1    7/2014

OTHER PUBLICATIONS

"Optimizing Network Applications for 5G", Apr. 21, 2017, 2 pages, <https://www.ericsson.com/en/news/2017/4/optimizing-network-applications-for-5g>.

(Continued)

*Primary Examiner* — Kenneth B Wells
(74) *Attorney, Agent, or Firm* — Brian M. Restauro (57) ABSTRACT

Embodiments of the present invention provide methods, computer program products, and systems. Embodiments of the present invention receive a request for a machine learning model and information associated with decisions made by the machine learning model. Embodiments of the present invention can determine one or more machine learning modules that satisfy the received request and create a dedicated traffic channel to send the determined one or more machine learning modules and information associated with the decisions made by the machine learning model. Embodiments of the present invention can transmit the determined one or more machine learning modules and information associated with decisions made by the machine learning model to a computing system using the created, dedicated traffic channel.

20 Claims, 6 Drawing Sheets

(56) References Cited

U.S. PATENT DOCUMENTS

2010/0331023 A1   12/2010  Cai
2015/0097683 A1    4/2015  Sloo
2016/0125726 A1    5/2016  Gordon

OTHER PUBLICATIONS

"View on 5G Architecture", 5G PPP Architecture Working Group, Version 3.0, Jun. 2019, 166 pages.

AHMAD et al., "Security for 5G and Beyond", ResearchGate, May 2019, DOI: 10.1109/COMST.2019.2916180, 42 pages.

Disclosed Anonymously, "Method and Apparatus for Cognitive Hazard Detection and Resistant for User Devices", An IP.com Prior Art Database Technical Disclosure, IP.com No. IPCOM000255260D, IP.com Electronic Publication Date: Sep. 12, 2018, 3 pages.

Disclosed Anonymously, "A novel way for sophisticated virtualization support in Software Defined Network", An IP.com Prior Art Database Technical Disclosure, IP.com No. IPCOM000237702D, IP.com Electronic Publication Date: Jul. 4, 2014, 8 pages.

Disclosed Anonymously, "A distributed virtual share network for mobile device", An IP.com Prior Art Database Technical Disclosure, IP.com No. IPCOM000254131D, IP.com Electronic Publication Date: Jun. 5, 2018, 6 pages.

Mao et al., "A Survey on Mobile Edge Computing: The Communication Perspective", arXiv:1701.01090v4 [cs.IT] Jun. 13, 2017, 37 pages.

Nieminen, Jesse, Framework for application of machine learning algorithms in telecommunications, Espoo Feb. 24, 2020, Copyright © 2020 Jesse Nieminen, 97 pages.

\* cited by examiner

INSIGHT ALLOTMENT TO EDGED LOCATIONS

BACKGROUND

The present invention relates in general to telecommunications networking and Internet of Things (IoT) devices and in particular to improving locally generated decision utilizing insights of other IoT devices in the same field.

Advanced telecommunications networks, including 5G networks, offer certain features that are far more sophisticated and flexible than predecessor technologies. For example, 4G networks offer trilateration capabilities that allow a carrier to locate a user's position within about a hundred feet by comparing signals from multiple cell towers. 5G and later networks, however, can trilaterate a device's location with at least one order-of-magnitude greater precision, allowing a user's position to be identified within a range of tens of feet.

5G and similar networks can also handle far more simultaneous connections, making them more practical for Internet of Things applications, which can associate numerous IoT sensor devices with a single user. Such networks can also open high-bandwidth ad hoc channels that exhibit very low latency, allowing large groups of users to connect and disconnect at will in a dynamic mesh network. In addition, these networks can integrate artificially intelligent or cognitive applications directly into their network infrastructure, rather than requiring such functionality to be implemented as extrinsic services hosted by a cloud-computing service or other third-party resource.

5G networks enable the mass deployment of IoT devices by providing the ability to dynamically manage very large numbers of devices on ad hoc mesh networks. If, for example, a thousand people watching a parade are each carrying an average of five IoT devices, a legacy Internet Service Provider (ISP) would likely be unable to simultaneously manage and correlate the resulting large number of connections. The flexible service-orchestration capabilities of a 5G network, on the other hand, after detecting the presence of a mass assembly, allow the network to dynamically create an ad hoc mesh network that continuously adds and removes users as IoT devices log in and log out. Unlike legacy networks, which would require an extrinsic application, such as a hosted cloud service, to even approximate such features, 5G platforms support such high-speed ad hoc infrastructure through integrated, native orchestration services.

SUMMARY

According to an aspect of the present invention, there is provided a computer-implemented method. The method comprises receiving a request for a machine learning model and information associated with decisions made by the machine learning model; determining one or more machine learning modules that satisfy the received request; creating a dedicated traffic channel to send the determined one or more machine learning modules and information associated with the decisions made by the machine learning model; and transmitting the determined one or more machine learning modules and information associated with decisions made by the machine learning model to a computing system using the created, dedicated traffic channel.

BRIEF DESCRIPTION OF THE DRAWINGS

Preferred embodiments of the present invention will now be described, by way of example only, with reference to the following drawings, in which.

DETAILED DESCRIPTION

Enhanced Mobile broadband (EMBB) is one of the major aspects of 5G that provides faster wireless connections and extends cellular coverage, including previously underserved areas. This also gives support for more devices and more data in densely populated areas and enables high-bandwidth applications such as augmented and virtual reality. EMBB allows for a focus on content and speed. EMBB enhances dynamic network configuration and management, placing reception and speed where needed. This improves connectivity and apps on mobile devices or tablets on shop floors as they refresh faster and connect more broadly across networks.

Typically, 5G architecture comprises multiple bearer channels from Radio Access Network (RAN) between a user end device and an Evolved Node B (eNodeB). The data sending and reception in a bearer channel are transported by an S1 bearer between an S-GW and an eNodeB, and by a radio bearer between a user endpoint (UE) and an eNodeB. One or more logical channels are established on top of Radio bearer and S1 bearer on which the application traffic is transmitted and controlled.

With the massive broadband network enablement in 5G, there are many devices that directly access a 5G network along with massive number of devices interconnected via means of 5G services. Embodiments of the present invention take advantage of the enhanced connectivity that is enabled by 5G technology by leveraging a service programmability framework that improves the decision-making capacity of service orchestration instances.

Embodiments of the present invention recognize that advancements can be made to 5G technology to push execution logic to edged locations instead of moving the data. Embodiments of the present invention recognize that the migration of data has huge penalties associated with it as the amount of data becomes tremendous as the model becomes mature. Thus, instead of moving data to the computing entity, embodiments of the present invention leveraging 5G technology provides new mechanisms of pushing execution logic to the edged location. In this manner, an edged entity (e.g., a last milestone computation such as an IoT device) will be able to take the decisions locally. Embodiments of the present invention recognize that 5G network efficiency can be improved when decisions are made locally because this reduces (i.e., saves) the radio bearer traffic and fixed access network traffic.

As this becomes more common, embodiments of the present invention recognize constraints (i.e., requirements)

of edged computing that allows logical decisions to be made by local entities. Typically, the locally fetched data is available for computation at endpoint locations (e.g., mobile or IoT device) and the control, execution, and processing instructions are pushed from the 5G network to the device endpoint which will be used to compute the decision. In this case, when the service orchestration layer of 5G executes certain algorithms at edge (e.g., first hop), then the logic (MLM) is pushed to the end device that is executed at the endpoint entity.

In this manner, all the computations are performed using locally collected or inferred data. Embodiments of the present invention recognize the deficiencies of this method. For example, as the input data is very limited, the chances of accuracy are low in this case. Further, embodiments of the present invention recognize that the reduction in accuracy leads to improper solutions and improper results (e.g., derived from a machine learning model) received over network. This leads to limited use of such systems because of the limited accuracy.

Further, embodiments of the present invention recognize that sending information insights to a computation endpoint is not a straightforward task because of data transmission requirements. Typically, the computation endpoints on the edge have limited resources to accommodate the information insights transmitted to it and machine learning model processing that restricts the amount of information that can be pushed to the edged location. Even if more insights are pushed, the computing time and energy requirement of making the decision and acting on it increases which can cause delays in real time workloads. Hence, embodiments of the present invention recognize that selective information needs to be sent to the computation endpoints which should protect the MLM decisions from taking failure results.

Embodiments of the present invention recognize that there is no mechanism today that can improve the efficiency of the results. Thus, embodiments of the present invention provide solutions for improving results and train a machine learning model to make failure decisions. Embodiments of the present invention achieve this by pushing information insights learned and training a machine learning execution model to take action.

Recognizing this, embodiments of the present invention provide solutions in the form of a mechanism to push the situational failure insights to edged identities having similar work (e.g., functionally similar) and infrastructure environment to improve the locally generated decisions utilizing the insights of other devices working in the same field. In other words, embodiments of the present invention detect failure situations (e.g., complete or partial outage at the endpoints), collect information and insights that caused the failure from device integrators, and selectively share those insights with other entities connected to a 5G service orchestration layer belonging to a subscription list. For example, embodiments of the present invention create dedicated traffic channels (DTCH) to push the information insights along with execution logical push to the endpoints based on various computations held in service orchestration layer of 5G network as described in greater detail, later in this specification.

Figure 1:
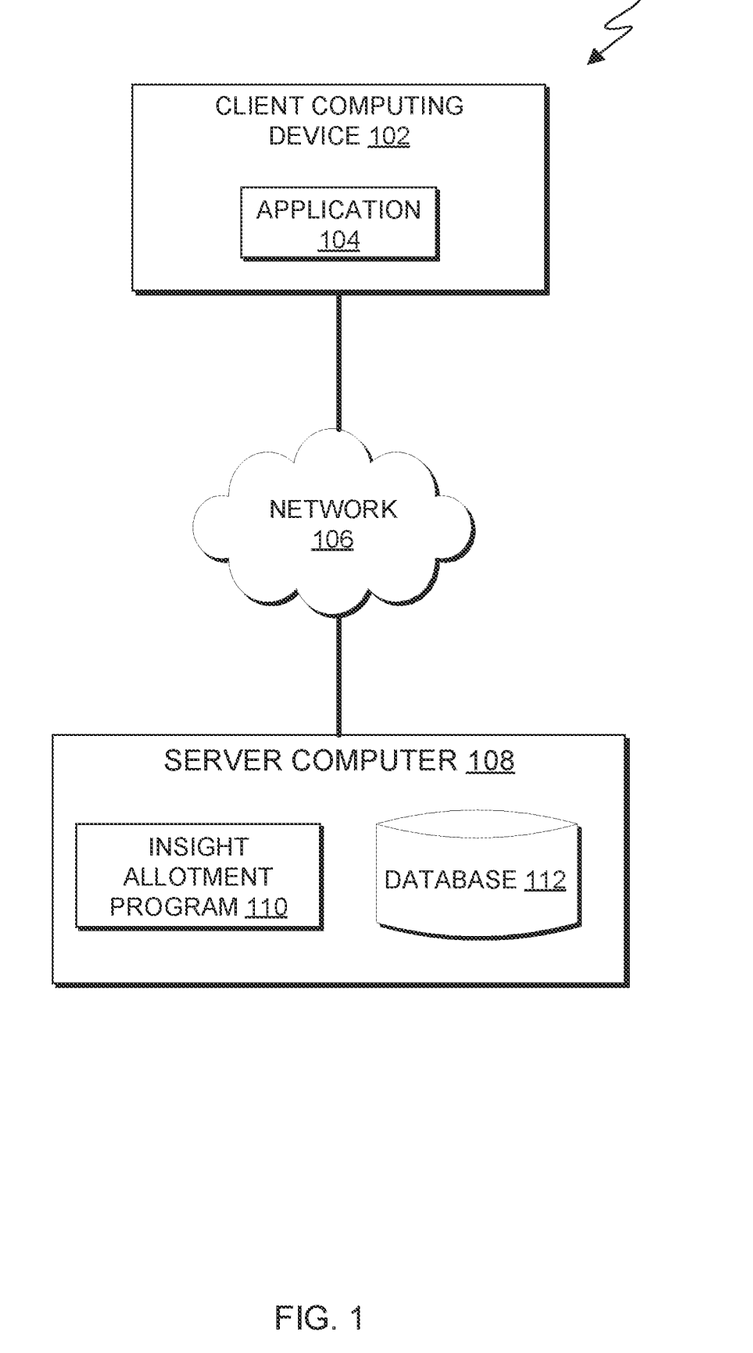
FIG. 1 depicts a block diagram of a computing environment, in accordance with an embodiment of the present invention.

FIG. 1 is a functional block diagram illustrating a computing environment, generally designated computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computers as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 6.

In this embodiment, client computing device 102 is a user device associated with a user and includes application 104. Application 104 communicates with server computer 108 to access insight allotment program 110 (e.g., using TCP/IP) to access content, user information, and database information. Application 104 can further communicate with insight allotment program 110 to transmit instructions to provide insights to one or more edged devices, as discussed in greater detail with regard to FIGS. 2-5.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications between client computing device 102 and server computer 108, and other computing devices (not shown) within computing environment 100.

Server computer 108 is a digital device that hosts insight allotment program 110 and database 112. In this embodiment, insight allotment program 110 resides on server computer 108. In other embodiments, insight allotment program 110 can have an instance of the program (not shown) stored locally on client computer device 102. In yet other embodiments, insight allotment program 110 can be stored on any number or computing devices.

Insight allotment program 110 improves local data computation in last mile transactions in 5G network and improves the result quality with a minimal set of data. Insight allotment program 110 can protect devices and other connected systems from experiencing failure by transmitting failure information of similar device hardware and applications that have failed to the other connected systems (e.g., by getting failure information from peers on the endpoint computing at the edge). Insight allotment program 110 can further reduce the chances of a machine learning module making a wrong decision (e.g., a decision that leads to failure) by transferring information learned from previous machine learning model decision failures to local systems. Insight allotment program 110 enables a 5G telecom architecture to get controlled data transmission with intentional high bandwidth that further can be used for futuristic mobility devices that comprises important data which needs to be protected. For example, insight allotment program 110 can enable manufacturers of personal and embedded devices to provide more efficient self-caring smarter devices, thus preventing data loss, underperforming situations, hazards and fault occurrence.

In this embodiment, insight allotment program 110 works (as an instance functioning) in a 5G networked infrastructure and collects the information from computational endpoints about the outcomes of a situation and machine learning model decisions that lead to failure scenarios (and/or system outages). Insight allotment program 110 can access or otherwise use a map of subcarrier locations, endpoints with their respective infrastructure, and working similarities. Insight allotment program 110 can collect information and stream data using virtual network functions of the 5G telecom network. Insight allotment program 110 can then inform another endpoint computation devices when the selected MLM is pushed to the target endpoints.

In this embodiment, insight allotment program 110 comprises a thin layer implemented at the computational endpoint devices (e.g., last mile computing entities such as client computing device 102) that will collect the snapshot-based information after MLM decisions are incorporated and accordingly selects the failure cases of machine learning model computations.

In this embodiment, insight allotment program 110 can instruct the service orchestration layer in the 5G telecom network to collect data after the MLM local decisions are computed. Insight allotment program 110 can accordingly update the metadata mappers that are sent over a dedicated subscribed logical channel to the target endpoints to get the probable MLM failure insights.

In this embodiment, insight allotment program 110 can be triggered (or otherwise activated) in two ways. For example, insight allotment program 110 can be activated when edged computing is triggered in the 5G network and either a related machine learning module or execution logic is requested by a 5G computation endpoint at an edged location (e.g., edged cloud, or last mile delivery location) to the service orchestration layer of the 5G network.

In this scenario, insight allotment program 110 can push the execution logic to the selected entity (e.g., a 5G computation endpoint) via S1 or Radio link layer protocols (e.g., MAC based RLL). Once the execution logic MLM is reaches to the target location, then insight allotment program 110 can instruct subsequent data processing to be performed at the edged location and the decisions are generated accordingly.

Insight allotment program 110 can generate and maintain a list of devices participating in insight delivery. In other words, insight allotment program 110 can maintain a subscriber list of one or more devices that are availing benefits of the peer failure decision analysis performed by insight allotment program 110 at the service orchestration layer. In this embodiment, insight allotment program 110 generates and maintains this list by creating a special purpose service in orchestration plane that can manage the generated subscription list, manage the similar MLM requirements based on endpoints, and push the failure cases to the 5G-endpoints based on the requirements. When any MLM or execution logic transfer request comes to the service instance of the invention, then insight allotment program 110 can then push the execution logic via usual means of existing 5G infrastructure.

In this embodiment, insight allotment program 110 can then monitor activity at the logical endpoints receiving the execution logic. In this embodiment, insight allotment program 110 can receive requests from the service instance (e.g., on the logical endpoint) once the MLM is pushed to the logical endpoints, to seek results from the devices. For example, at the client end implementation, when an endpoint gets the MLM or execution logic, then the client device can perform computations and execute accordingly. After the client device executes, the thin layer (of insight allotment program 110) implemented in the client instance searches for the outcomes.

In this embodiment, insight allotment program 110 can, in response to a request for an outcome, take snapshots (e.g., record results and circumstances associated with the results) on the local system to get the situational insights of the decisions made by the machine learning model leveraged by the client device. In this embodiment, insight allotment program 110 can take these snapshots at a pre-defined frequency. The frequency can be set by either insight allotment program 110 or by a programmability framework.

Insight allotment program 110 can then create a dedicated DTCH to transmit the snapshots. In this embodiment, insight allotment program 110 can create a dedicated DTCH as a special purpose DTCH for a temporary time frame when the snapshots need to be transferred to a service instance of the invention. Insight allotment program 110 can then analyze these snapshots to determine system performance after the MLM decisions were executed. In this embodiment, this special purpose DTCH functions as an asynchronous data transmission link over Backhaul network. In circumstances that insight allotment program 110 detects a failure that resulted from decisions made by a machine learning model, insight allotment program 110 can then invoke metadata mappers on the orchestration plane and save the particular conclusions as instances to be used to train future machine learning model decisions.

Insight allotment program 110 can then determine other devices that have similar circumstances to circumstances that have led to a system failure by requesting information from other devices. For example, insight allotment program 110, functioning in the service orchestration layer of the 5G telecom network can receive a subscribed list of devices that it should monitor. Insight allotment program 110 can then transmit an instruction (e.g., using the orchestration layer) to collect data from devices for an information exchange. In this embodiment, insight allotment program 110 collects information from mobile devices like DTCH streams via integration of device snap along with location information, and user location and this information is transmitted to 5G service orchestration for insights computation mappers. In this embodiment, insight allotment program 110 can classify this received information (e.g., these streams) to recognize any points of failure and map that information to a respective platform having that failure as well as deployment framework of 5G endpoints connected to the platform.

Insight allotment program 110 can then instruct the service orchestration and programmability framework to maintain the database of similar deployment and infrastructure where the similar MLMs can be applied to take local situational decisions. In response to a request for machine learning model insights, insight allotment program 110 performs a subscription check, determines devices having similar deployment and infrastructure, and sends the MLM to the target devices. In this embodiment, insight allotment program 110 can create and subsequently initiate a special purpose DTCH between the service (e.g., insight allotment program 110) and client instance of insight allotment program. In this embodiment, the special purpose DTCH is a dedicated traffic channel of 5G (Radio-DTCH or S1-DTCH) and is used to transfer the failure insights to one or more target endpoints (e.g., locations). Insight allotment program 110 can then destroy (e.g., dismiss) the created channel after transmitting failure insights (e.g., failure cases, decisions, infrastructure, etc.) to the target locations.

On the client side, insight allotment program 110 can then transmit instructions to have the machine learning model use the failure insights to the MLM so that the MLM gets additional insights (other than using local data as input). Insight allotment program 110 can then validate the machine learning model outcome with the failure probability against failure insights received from orchestration plane. In scenarios where insight allotment program 110 confirms that the machine learning model's decisions are failure prone (based on failure insights), then insight allotment program 110 concludes that there is a high chance that the MLM decision will lead to system outage or temporary outage. Insight allotment program 110 can then trigger re-computations.

Insight allotment program 110 can then prevent execution of decisions that are determined to be failure prone. In this manner, insight allotment program 110 reduces chance of failure while also providing the flexibility to the target locations to recompute the decisions based on failure probability derived from other nodes working in the same environment.

In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment, database 112 is stored on server computer 108.

Figure 2:
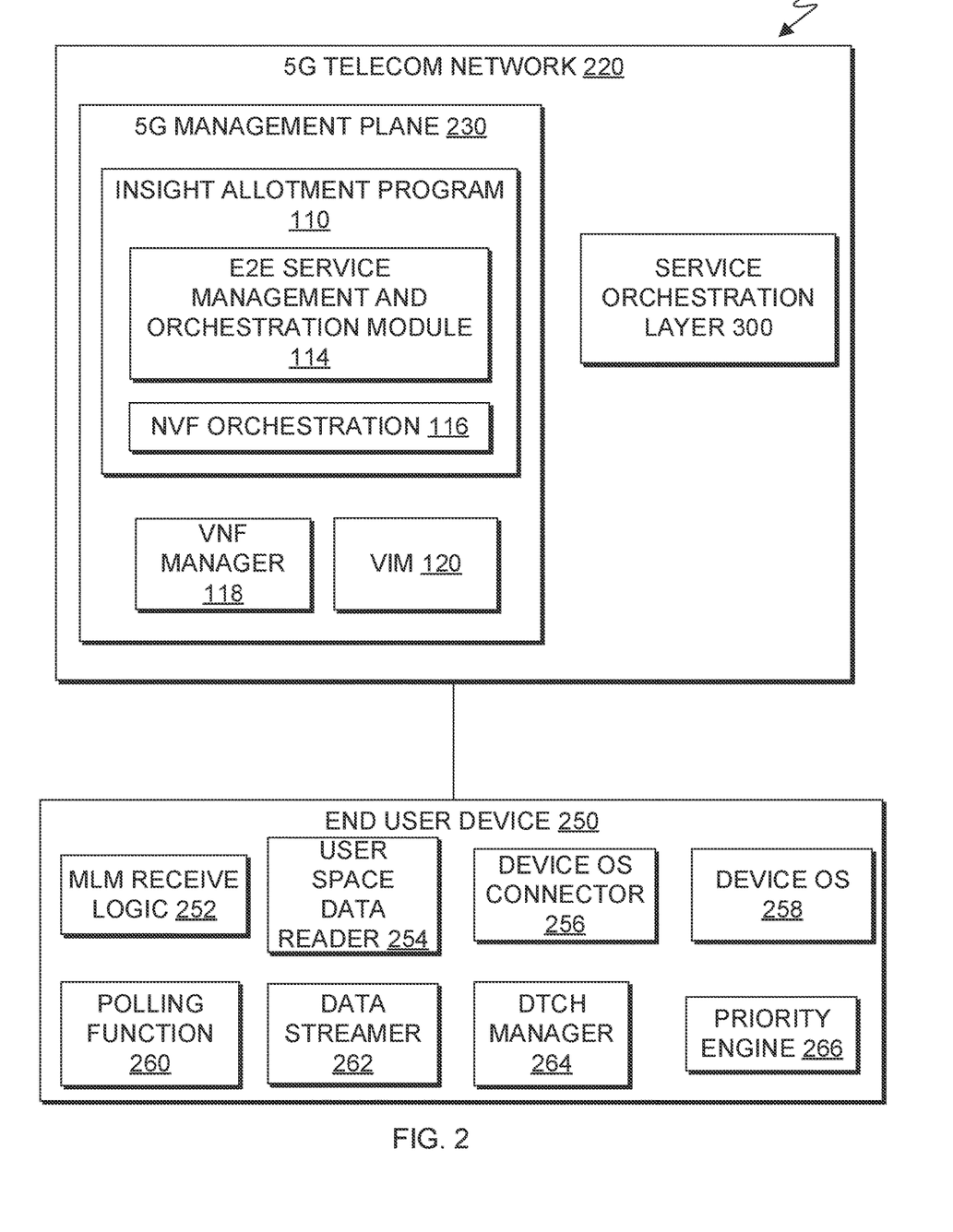
FIG. 2 depicts an alternate block diagram of a computing environment, in accordance with an embodiment of the present invention.

FIG. 2 depicts an alternate block diagram of a computing environment 200, in accordance with an embodiment of the present invention.

In this diagram, computing environment 200 is shown. Computing environment 200 includes 5G telecommunications network 220 and an end user device 250 connected over a network (not shown).

In this embodiment, 5G telecommunications network 220 includes a 5G management plane 230 and service orchestration layer 300. 5G service management plane 230 offers various features that serves as a base for service instances in this invention. In general, it has infrastructure for inter-service management and platform-based message queue architecture that will be used to communicate between the components of the 5G services and infrastructure plane.

Figure 3:
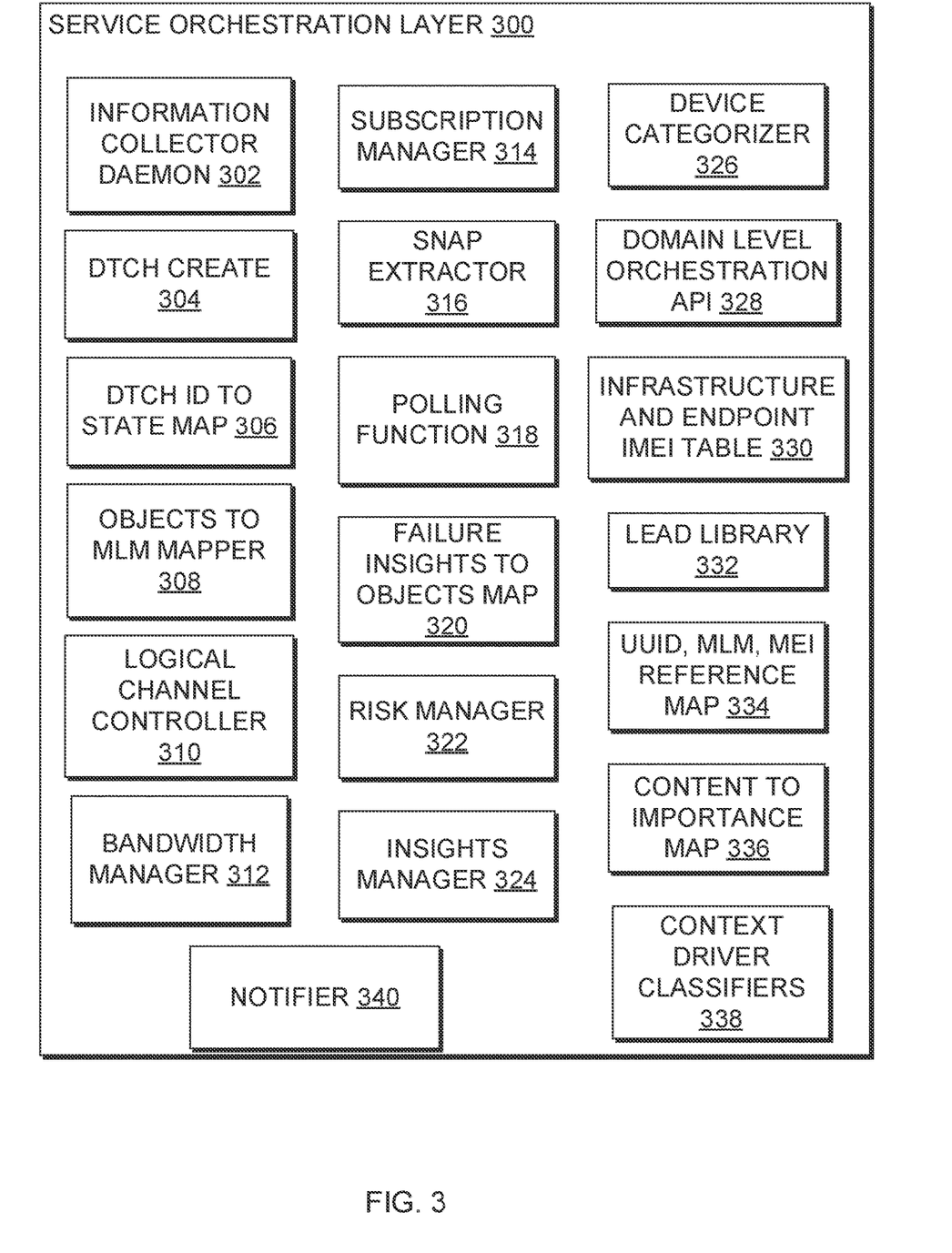
FIG. 3 depicts components of a service orchestration layer, in accordance with an embodiment of the present invention.

Service orchestration layer 300 houses all the application service instances running as part of the Global 5G network (as discussed in greater detail with respect to FIG. 3). As part of 5G deployment models, 5G serves network itself to become cognitive and AI enabled. Service orchestration layer 300 of 5G telecommunications network 220 plays an important role by offering service deployment, monitoring and real time processing of the services deployed in this layer. The service instance of insight allotment program 110 that collects and manages the insights of the device failure decision is resident at service orchestration layer 300 and operates in conjunction with other services in the UP (User Plane) Stack for insights collection.

In this embodiment, the 5G management plane 230 includes insight allotment program 110, VNF manager 118, and VIM 120 (e.g., programming interfaces to VNF functions that abstracts Physical Network Function and communication interfaces in 5G network).

In this embodiment, insight allotment program 110 contains one or more modules to improve local data computation in last mile transactions in the 5G network and improve the result quality with a minimal set of data. In this embodiment, insight allotment program 110 includes E2E service management and orchestration module 114 and NVF orchestration 116.

E2E service management and orchestration module 114 are the interfaces that allow the 5G bandwidth connections to persist across various infrastructure components in the network. E2E service management orchestration module (e.g., platform) ensures that the created logical partitions and internally segmented logical bandwidth allocations are created well to operate the essential operations of the mobility management (like handovers and handoffs between the small cells, etc.). E2E management platforms include quality of service management (not shown) that ensures the E2E traffic management and monitoring.

Network functions virtualization (NVF) orchestration 116 (also referred to as NVF 116) refers to the process that separates network functions from hardware and provides and abstraction to create a virtualized network that runs independently of hardware platforms. At the core of NFV are virtual network functions (VNFs) that handle specific network functions like firewalls or load balancing along with access control policies. Individual VNFs can be connected or combined together as building blocks to create a fully virtualized environment. Each VNF is connected to one (or many PNFs) that has physical network functions to operate VNF manager 118 works in concert with the virtualized infrastructure manager (VIM) and the NFV orchestration 116 to help standardize the functions of virtual networking and increase the interoperability of software-defined networking elements. VIM 120 is a virtual infrastructure manager that is in an existing 5G layer that works below the Virtual network functions and provides the conversion facility between VNF and PNF functions.

In this embodiment, end user device 250 includes MLM receive logic 252, user space data reader 254, device OS connector 256, Device OS, 258, polling function 260, data streamer 262, DTCH manager 264, and priority engine 266, all connected via a communications hub (not shown).

MLM receive logic 252 is a computer program running at the logical endpoint of the communication system and collects the machine learning model when as it is part of MLM enquiry messages. When the edged computing is triggered in the 5G network, the related Machine Learning Model or execution logical is requested by 5G computation endpoint at edged location (e.g., can be edged cloud or last mile delivery location) to service orchestration layer of the 5G network. In this scenario, insight allotment program 110 pushes the execution logic to the selected entity via S1 or Radio link layer protocols (MAC based RLL). Such pushed MLM will be received by MLM receive logic 252 as a bundled algorithm that can be executed at the UE device of communication endpoints.

User space data reader 254 is the consumer engine that reads the data from intermediate stream buffers. When the polling functions detect that the service (e.g., insight allotment program 110) is ready to send the data, then this data will be received in the temporary buffer space in the local machine by user space data reader 254 and then will be moved to the respective repositories based on the requirement.

Device OS connector 256 is the device operating system interconnect logic that provides the call-gates to connect with 5G network with physical interfaces. It also provides the supporting drivers for handling RLC controls over the network that serves as a bridge between the endpoint. Device OS 258 is an operating system running at the last mile delivery location and UE.

Polling function 260 includes running process demons at the UE devices that polls for the reception event once the MLKM request is being sent by the UE to networked infrastructure of 5G. Once the MLM is demanded by last mile delivery locations, then the 260 will be activated to locate the transmission start event. Polling function 260 detects that the service instance (e.g., insight allotment program 110) is ready to send the MLM, then the service instance can send a message MLM receive logic 252 for reception of the MLM.

Data streamer 262 collects the information from other modules in the UE device and sends it to the service instance as a data stream. This data will be saved at a temporary memory location at the data streamer and then will be transferred to the service instance as a data stream. The stream is used here as there might requirements of sending continuous data to service instance where the stream-based sending is helpful. Data streamer 262 keeps the service instance consistent and sends data that is different with consistency preservation.

DTCH manager 264 is logical channel manager that manages logical slicing of 5G network bandwidth and quality of service attributes over the radio interface. This layer comprises DTCH management interface (not shown) and connection logic that ensures end-to-end packet delivery with pre-defined quality sustenance across the network components (e.g., Radio, S1, S-GW). DTCH manager 264 has a mapping database for applications to channel IDs that will be used for link level packet flow management.

Priority engine 266 determines which MLM is to be requested first in case there are multiple MLM requests coming from upper applications layers. In scenarios that include a multi-functional last mile device, then there is a chance that multiple MLM and insights can be requested at the same time. Accordingly, priority engine 266 determines the priority based on application weighting levels and processes the MLMs accordingly.

FIG. 3 depicts components of a service orchestration layer, in accordance with an embodiment of the present invention.

Service orchestration layer 300 includes information collector daemon 302, DTCH create 304, DTCH ID to state map 306, objects to MLM mapper 308, logical channel controller 310, bandwidth manager 312, subscription manager 314, snap extractor 316, polling function 318, failure insights to objects map 320, risk manager 322, insights manager 324, device categorizer 326, domain level orchestration API 328, infrastructure and endpoint IMEI table 330, lead library 332, UUID, MLM, MEI reference map 334, content to importance map 336, context driver classifier 338, and notifier 340.

Information collector daemon 302 is service instance paired with data streamer 262 and receives the data stream from the UE devices. Information collector daemon 302 can be multiple user end (UE) devices that are sending the data streams hence it has a fork-based system that captures the data coming from each device and updates the records accordingly. Information collector daemon 302 maintains the consistency of the incoming data and saves the information to respective data stores.

DTCH create 304 is DTCH create logic and deals with logical channel creation between the UE device and the service instances and patching of the correct DTCH from VNF to the service instance. This can be further used to create internal logical channels between the services for message exchange and MAC based PDU exchange within the orchestration layer.

DTCH ID to state map 306 is a mapper function that keeps the mapping of each DTCH created to all the UEs and their states. The states can be active, inactive, or idle based on the nature of data transmission and activation of target systems for MLM transmission requirements.

Objects to MLM mapper 308 is also a mapper function which comprises the objects and MLM mapping. The metadata insights objects and their accessibility to the MLMs are mapped in this function so that the correct MLM insights can be pushed when demanded.

Logical channel controller 310 polls for the state of the logical channel using DTCH ID to state map 306 and accordingly controls the resource allocation at virtual network function. In this embodiment, where the channel is detected as being inactive for a relatively long time, logic channel controller 310 keeps the DTCH on sleep mode and bandwidth will be reduced until needed.

Bandwidth manager 312 offers the communication interfaces to the VNF functions to change the channel bandwidth when needed. This is typically being invoked by logical channel controller 310 in case channel bandwidth needs to be changed (e.g., increased or decreased) based on demands.

Subscription manager 314 keeps track of which UE devices are subscribed to services provided by insight allotment program 110 and offers additional mechanisms to facilitate MLM and insights exchange (e.g., used for device authorization purpose). For example, in some embodiments, insight allotment program 110 can leverage subscription manager 314 to follow one or more multiple authentication policies based on nature of access and this function will maintain the access polices and offer subscription management.

Snap extractor 316 collects the snap received by information collector daemon 302. Snap extractor 316 can then extract the attributes in the information which will be used for insights generation and similarity plotting.

Polling function 318 polls for the MLM and insights requests from the client devices and triggers internal component when any new service request is received. Failure insights to objects map 320 keeps the mapping of MLM based insights and their object listing. The MLMs for which the insights are computed are mapped as part of this function and will be used to trace the insights for specific models.

Risk manager 322 offers the functionality of storing confidence values for the insights and will be used while selecting the MLM and understandings when requested by the UE device. Insights manager 324 manages insights received from insight allotment program 110.

Device categorizer 326 categorizes devices like IoT devices, mobile devices, etc. so that their insights can be distinguished when demanded. The IoT devices for voice sensors will be same hence it needs to be selected by this categorizing mapping. This is extracted based on outputs from snap extractor 316 for deployment models.

Domain level orchestration API 328 offers the base platform interfaces for 5G device communication that includes platform message queue and communication interfaces between the services and generic functions. These are set of APIs that offers lower level services to communicate the services.

Infrastructure and endpoint IMEI table 330 keeps the IMEI numbers of the UE devices for authorization purposes. Lead library 332 provides library functions that are being used for dataset updating and preserving ACID properties of transaction in the system. There will be multiple users availing this invention hence the lead libraries are used to maintain the map updates.

UUID, MLM, MEI reference map 334 keeps the records for UUID, MEI and MLM reference map. Content to importance map 336 maintains the importance of each insight object to ensure the better insights are delivered to the user. Content to importance map 336 can use importance of each insight object in conjunction with subscription manager 314 to deliver the policy-based insights with accuracy.

Context driver classifiers 338 are existing classification modules that are used to classify the information. In this embodiment, any classification technique can be used. Notifier 340 is a notifier service that triggers internal system notifications to VNF and lower level systems to get the operation done. Notifier 340 can also be used to notify client instance for the delivery messages like success or failure of the incoming requests.

Figure 4:
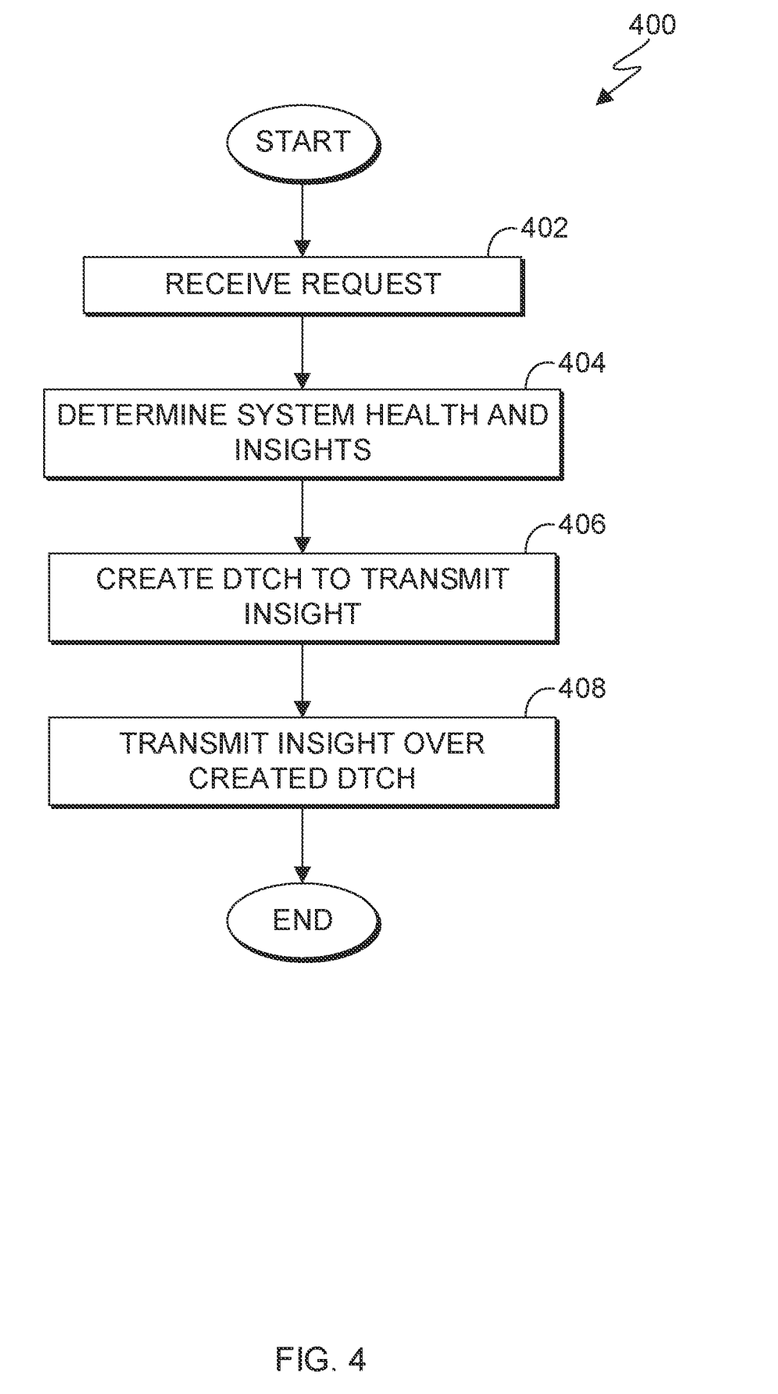
FIG. 4 is a flowchart depicting operational steps for providing insights to an edged device, in accordance with an embodiment of the present invention.

FIG. 4 is a flowchart 400 depicting operational steps for providing insights to an edged device, in accordance with an embodiment of the present invention.

In step 402, insight allotment program 110 receives a request. In this embodiment, insight allotment program 110 receives a request from client computing device 102. In other embodiments, insight allotment program 110 can receive information from one or more other components of computing environment 100.

In this embodiment, a request can include a request for a machine learning model and information associated with at least one machine learning model. In this embodiment, information associated with at least one machine learning model can include system specifications for which the machine learning model was used. Information can also include applications used by the system and certain conditions exhibited by the system during a failure. The conditions can include one or more inputs that led to the machine learning model making a decision that resulted in a failure. For example, if two 5G enabled IoT devices at the endpoint locations are deployed in the similar infrastructure, then insight allotment program 110 can identify the similarity and allot insights to each of those 5G enabled IoT devices based on the snap shared with the orchestration service instance of insight allotment program 110. Stated another way, if the local decision in such cases led to failure of the system, then such information will be kept as a learning to service instance and will be used by second MLM push operation.

Optionally, a request can also transmit device information (e.g., system requirements, system specifications, etc.). In other embodiments, a device can automatically request (and insight allotment program 110 can subsequently receive the request), each time it requires a machine learning model to make a decision. In other embodiments, the device can automatically request insights at regularly scheduled intervals of time.

In this embodiment, a failure as used herein refers to one or more errors that result in a system shutting down. A failure can also refer to one or more errors that result in a system unable to complete a task. A failure could be a result which is not expected as part of execution outcome at the endpoint location. For example, a MLM took the decision X and expecting outcome as Y. In this scenario, the output confidence of expecting outcome Y is less than expected then the outcome that happens, insight allotment program 110 concludes that output is a failure. A failure can also be defined as a process unable to complete any service action, low confidence outcome, or unexpected results.

In step 404, insight allotment program 110 determines system health and insights. In this embodiment, insight allotment program 110 determines system and health insights by analyzing the received request and identifying, from a subscriber list of devices, one or more devices having similar system specifications and requirements. In this embodiment, similarity of one device to another device is defined as being functionally similar.

Insight allotment program 110 can then retrieve insights from the one or more identified devices (e.g., information stored about the one or more identified devices). In this embodiment, insights can include failure conditions, all inputs considered by machine learning models, specific inputs considered by the machine learning model that led to the decision that, when executed, caused a failure.

For example, insight allotment program 110 can identify one or more objects associated with respective identified devices. Insight allotment program 110 can then determine that information stored in one or more of the objects contains machine learning model inputs. For example, insight allotment program 110 can identify failure conditions and inputs that led to a machine learning model taking an action that resulted in a failure.

In step 406, insight allotment program 110 creates a DTCH to transmit the determined insight. In this embodiment, insight allotment program 110 comprises a dedicated bandwidth and QCI allocation based on pre-defined radio access policies. In this embodiment, the created DTCH collects data in asynchronous transmission. In this embodiment, insight allotment program 110 creates a time and purpose DTCH that is used only to transmit data that satisfies the received request. In other words, insight allotment program 110 configures the DTCH to dissolve or otherwise expire after data transmission.

In step 408, insight allotment program 110 transmits the determined insight over the created DTCH. In this embodiment, insight allotment program 110 transmits the determined insight to the device (e.g., at 5G last mile delivery location) that requested insights via network 106. Insight allotment program 110 can then dissolve or otherwise close the DTCH by activating a close command. Insight allotment program 110 can then update any related virtual network functions.

Insight allotment program 110 can then transmit instructions to the device to collect information. In this embodiment, the information collected refers to a snapshot of the services, conditions, decisions, and system hardware and software of the device. In this way, insight allotment program 110 can enable peering with existing snap extraction and insight services via 5G based MAC protocol or out-ofband approaches over shared bus communication message queue architecture of 5G technology.

In this manner, by performing the operational steps of flowchart 400, insight allotment program 110 can ensure that the MLM decisions with local data and failure chances based on received insights and regeneration will be triggered to get better results to avoid the system failures and lockdowns.

Figure 5:
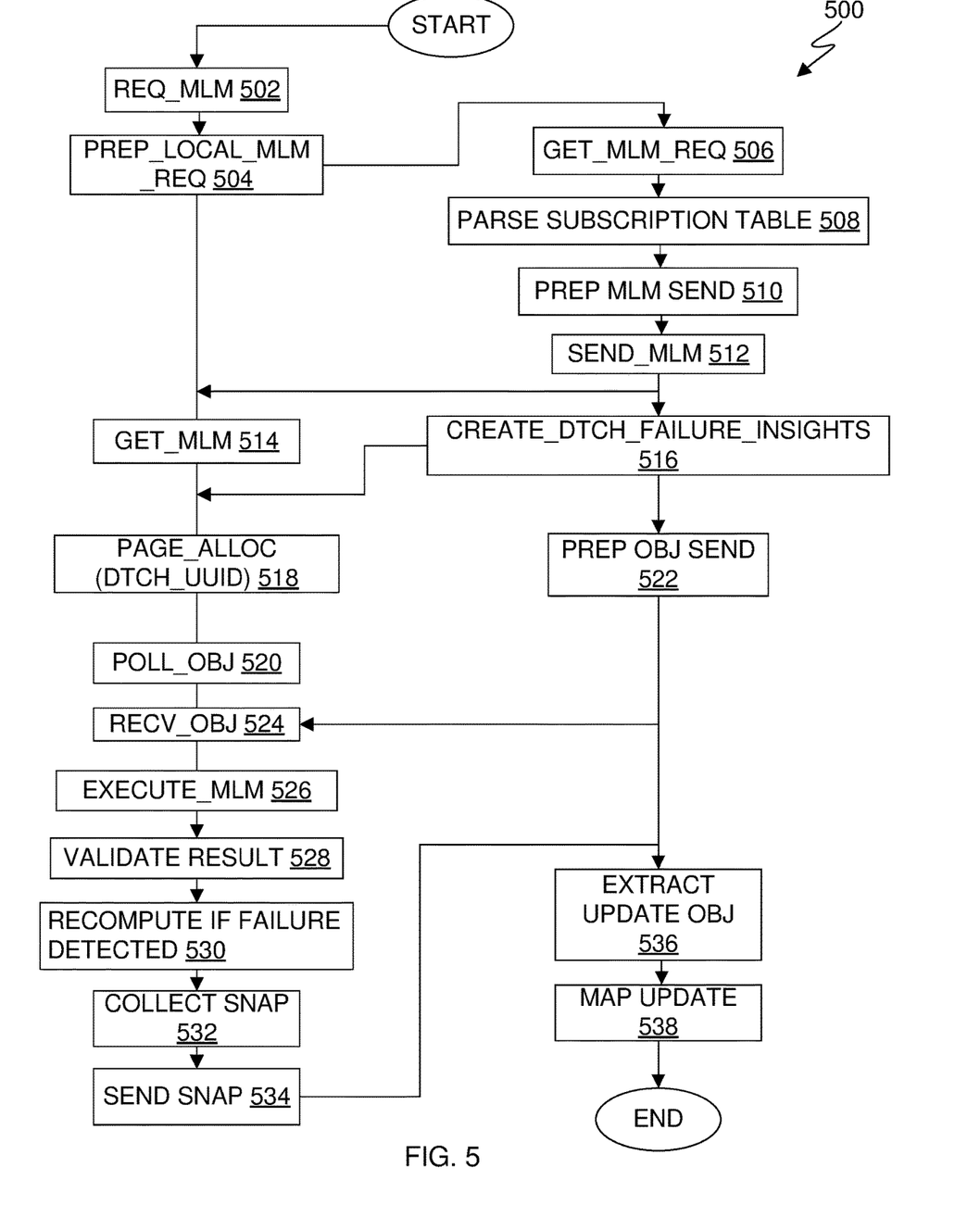
FIG. 5 is a flowchart depicting alternate operational steps for providing insights to an edged device, in accordance with an embodiment of the present invention.

FIG. 5 is a flowchart 500 depicting alternate operational steps for providing insights to an edged device, in accordance with an embodiment of the present invention. In this flowchart, logic blocks depicted herein references operational steps performed at client and server side.

In step 502, insight allotment program 110 can detect a request. In this embodiment, insight allotment program 110 detects a client request from a client device when the client requests a machine learning model or execution logic requirements from a local endpoint (e.g., a client request from a client device).

In step 504, the client device (e.g., client computing device 102) prepares to send and subsequently send the machine learning model request to insight allotment program 110. In this embodiment, the client device transmits the following command to prepare and subsequently send the machine learning model request: prep local MLM.

In step 506, on the server side, insight allotment program 110 receives the request from the client device. In this embodiment, insight allotment program 110 receives the request and transmits the following command to begin fulfilling the request: get_MLM_req. For example, a received request could be a request for machine learning model or execution logic requirements from a local endpoint (e.g., a client request from a client device).

In step 508, insight allotment program 110 parses the subscription table. In this embodiment, insight allotment program 110 parses the subscription table by identifying one or more devices connected to insight allotment program 110 and that are listed in the subscription table. For example, insight allotment program 110 seeks machine learning models that fulfills the received request.

In step 510, insight allotment program 110 prepares to send the machine learning models that fulfills the request. In this embodiment, insight allotment program 110 prepares to send the machine learning models using the following command: prep MLM send. In this embodiment, insight allotment program 110 can create a DTCH channel to send the machine learning models.

In step 512, insight allotment program 110 sends the machine learning model information to the client device. In this embodiment, insight allotment program 110 sends the machine learning model information via network 106. In this embodiment, machine learning information includes the machine learning model as well as failure insights also need to travel (so as to serve as instant training corpus for failures and adds robustness to the travelled Machine Learning Models). Once the MLM is pushed, then the logical channel will be used to send the insights corpus. This will be set of attribute value tuples and the failure information.

In step 514, on the client side, the client device receives (i.e., gets), the machine learning module information from insight allotment program 110 via network 106.

In step 516, insight allotment program 110 creates DTCH failure insights and sends them to the client device. In this embodiment, insight allotment program 110 creates DTCH failure insights by transmitting a framework for objects to be stored in. For example, insight allotment program 110 can transmit instructions to the client device to capture results of a machine learning model decisions, associate those results with the client device's universally unique identifier (UUID), and associated DTCH for that client device. Separate DTCH will be needed as the invention service of insight allotment program 110 might need to authenticate for the subscription policies before sending additional data to client location.

In step 518, on the client side, the client device receives an allocated DTCH UUID. In this embodiment, the client device will understand which DTCH to poll for insights reception. As the new DTCH is created by the upper layers, the information will be supplied to the UE device so that it can poll on correct logical channel for incoming packet flow for insights.

In step 520, insight allotment program 110 polls objects. In this embodiment, insight allotment program 110 polls objects for information from various resources at an end user device e.g., client computing device 102) via an information collector data streams in 5G network. Resources, as used herein refer to audio and video feeds, and other device monitoring tools. This is to create the local snap that needs to be exchanged with the service instance for determination of the similarity of the deployment and accordingly categorization will be made by the service instance so that relevant insights can be pushed to the target entity.

In step 522, insight allotment program 110 prepares to send objects that satisfy the request (e.g., audio and video feeds, and other device monitoring tools). Insight allotment program 110 can then translate the unstructured information to 5G service readable format using serial and parallel classification techniques to send to the client device. As used herein, objects refer to input attribute set or subset data attributes and outcomes that lead to failure. For example, if a function that is sent with the locally available information it predicts output as A from input attributes <X, Y, Z>, then insight allotment program 110 can generate insights for the respective MLM model function y=f(x)+c would be <X, Y, X, A>. This means that if the output is A when the input attributes are near to <X, Y, Z> then this will lead to a failure and suggests that re-computation is needed.

In step 524, on the client side, the client device receives the sent objects. In this embodiment, the client device receives the sent objects via the created DTCH channel.

In step 526, the client device executes the machine learning module. In this embodiment, the client device executes the machine learning module with data available from the client device in addition to the received objects containing failure information. In this embodiment, the client device executes the machine learning module according to existing configuration policies for the client system and subscription policies. In some embodiments, the client device can run the machine learning model without the insights and recalculate in response to receiving the insights. In this embodiment, the client device can directly use the received insights (e.g., as part of the subscription) and then map for failure cases.

For example, client device receives objects and insights from the program, runs the MLM again and the MLM concludes. There is a possibility of failure. If there is a possibility of failure, the client device acts and changes behavior. If the client device concludes no failure, then the system behaves normally. Regardless of the outcome, the client device takes a snapshot, notes the circumstances, and sends it back to the insight allotment program. In other words, the client device will get the insights as part of first run itself that can be matched before execution of the decision. If the MLM with insights data will indicate the failure chances, then re-computation will be triggered. This re-computation either uses different MLM or model function to take the decisions or execution of the MLM with more attributes.

In step 528, the client device validates the result. In this embodiment, insight allotment program 110 validates the machine learning model outcome with the failure probability against failure insights received from the orchestration plane. In scenarios where insight allotment program 110 confirms that the machine learning model's decisions is failure prone (based on failure insights), then insight allotment program 110 concludes that there are high chances that the MLM decision will lead to system outage or temporary outage.

In step 530, the client device recomputes if there is a probability of failure. If, in step 528, the client device detects there is a probability of failure, then the client device recomputes. The re-computation either uses different MLM or model function to take the decisions or execute the same MLM with more attributes based on defined policies.

In step 532, the client device collects a snapshot. In this embodiment, the client device collects a snapshot of system operating parameters by transmitting a command to collect information. In this embodiment, a snapshot contains information detailing the machine learning modules ran, inputs used, and results of the decisions made by the machine learning module. For example, a snapshot can indicate a failure that resulted in machine learning model decisions like a system outage of a breakdown of a mechanical system. Insight allotment program 110 can instruct the client device to collect the snapshot and update metadata with the device universally unique identifier (UUID).

In step 534, the client device sends the collected snap to insight allotment program 110. In this embodiment, the client device sends the snapshot in parallel asynchronous writes (e.g., DTCH snap).

In step 536, insight allotment program 110 extracts and updates objects from the received snap. In this embodiment, insight allotment program 110 extracts objects from the transmitted snapshot of the last mile user end device (e.g., the client device). Insight allotment program 110 can then classify or otherwise organize the extracted objects based on conditions and parameters associated with the objects.

In step 538, insight allotment program 110 maps and stores the update. In this embodiment, insight allotment program 110 can then map these classified objects and accordingly stores the information in a database (e.g., database 112).

Figure 6:
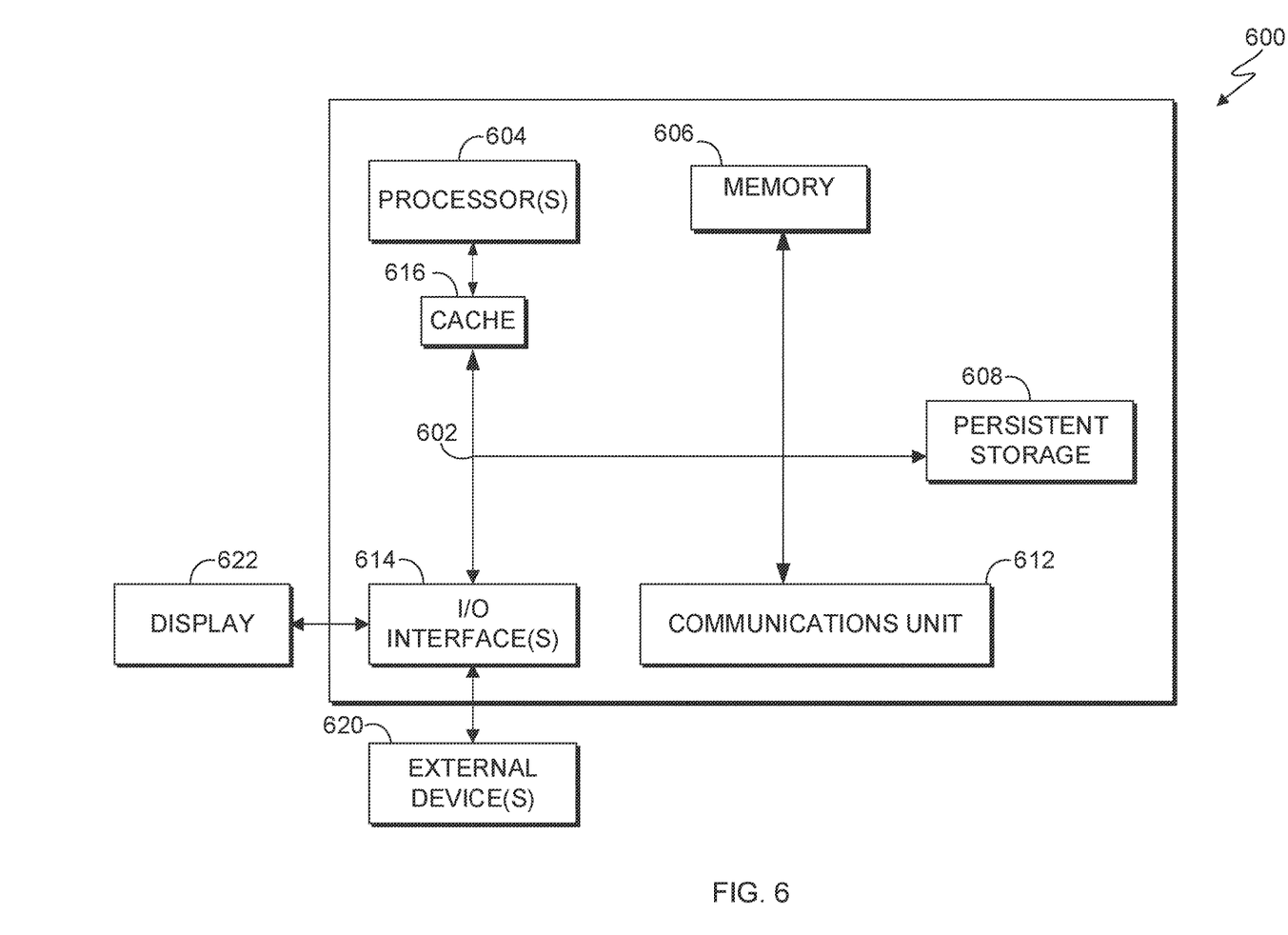
FIG. 6 is a block diagram of an example system, in accordance with an embodiment of the present invention.

FIG. 6 depicts a block diagram of components of computing systems within computing environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 600 includes communications fabric 602, which provides communications between cache 616, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Insight allotment program 110 (not shown) may be stored in persistent storage 608 and in memory 606 for execution by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links. Insight allotment program 110 may be downloaded to persistent storage 608 through communications unit 612.

I/O interface(s) 614 allows for input and output of data with other devices that may be connected to client computing device and/or server computer. For example, I/O interface 614 may provide a connection to external devices 620 such as a keyboard, keypad, a touch screen, and/or some other suitable input device. External devices 620 can also include portable computer readable storage media such as, for example, thumb drives, portable optical or magnetic disks, and memory cards. Software and data used to practice embodiments of the present invention, e.g., insight allotment program 110, can be stored on such portable computer readable storage media and can be loaded onto persistent storage 608 via I/O interface(s) 614. I/O interface(s) 614 also connect to a display 622.

Display 622 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving a request for a machine learning model and information associated with decisions made by the machine learning model;
determining one or more machine learning modules that satisfy the received request;
creating a dedicated traffic channel to send the determined one or more machine learning modules and information associated with the decisions made by the machine learning model; and
transmitting the determined one or more machine learning modules and information associated with decisions made by the machine learning model to a computing system using the created, dedicated traffic channel.

2. The computer-implemented method of claim 1, further comprising:
collecting data streams from a 5G telecommunications network comprising unstructured information from audio and video feeds; and
translating the unstructured information to a 5G service readable format using serial and parallel classification techniques.

3. The computer-implemented method of claim 2, further comprising:
transmitting instructions to the determined one or more machine learning models to process information associated with decisions made by the machine learning model and to process information stored locally by the computing system; and
executing a decision based on information associated with decisions made by the machine learning model.

4. The computer-implemented method of claim 2, further comprising:
updating a database comprising one or more machine learning models, respective information associated with decisions made by each of the one or more machine learning models, and associated computing system architecture using at least one machine learning model of the one or more machine learning models using a 5G based MAC protocol or an out-of-band approach over shared bus communication message queue architecture of a 5G telecommunications network.

5. The computer-implemented method of claim 1, further comprising:
validating machine learning decisions with local data of the computing system.

6. The computer-implemented method of claim 5, further comprising:
in response to determining a probable failure, updating metadata of the computing system with mapper objects and associating the mapper objects to a universally unique identifier of the computing system.

7. The computer-implemented method of claim 6, further comprising:
generating failure insights of machine learning models from received mapper objects of the computing system.

8. The computer-implemented method of claim 1, further comprising:
transmitting instructions to the computing system to transmit results of a machine learning model decision execution on local elements of the computing system in an asynchronous manner.

9. A computer program product comprising:
one or more computer readable storage media and program instructions stored on the one or more computer readable storage media, the program instructions comprising:
program instructions to receive a request for a machine learning model and information associated with decisions made by the machine learning model;
program instructions to determine one or more machine learning modules that satisfy the received request;
program instructions to create a dedicated traffic channel to send the determined one or more machine learning modules and information associated with the decisions made by the machine learning model; and
program instructions to transmit the determined one or more machine learning modules and information associated with decisions made by the machine learning model to a computing system using the created, dedicated traffic channel.

10. The computer program product of claim 9, wherein the program instructions stored on the one or more computer readable storage media further comprise:
program instructions to collect data streams from a 5G telecommunications network comprising unstructured information from audio and video feeds; and
program instructions to translate the unstructured information to a 5G service readable format using serial and parallel classification techniques.

11. The computer program product of claim 10, wherein the program instructions stored on the one or more computer readable storage media further comprise:
program instructions to transmitting instructions to the determined one or more machine learning models to process information associated with decisions made by the machine learning model and to process information stored locally by the computing system; and
program instructions to execute a decision based on information associated with decisions made by the machine learning model.

12. The computer program product of claim 10, wherein the program instructions stored on the one or more computer readable storage media further comprise:
program instructions to update a database comprising one or more machine learning models, respective information associated with decisions made by each of the one or more machine learning models, and associated computing system architecture using at least one machine learning model of the one or more machine learning models using a 5G based MAC protocol or an out-of-band approach over shared bus communication message queue architecture of a 5G telecommunications network.

13. The computer program product of claim 9, wherein the program instructions stored on the one or more computer readable storage media further comprise:
program instructions to validate machine learning decisions with local data of the computing system.

14. The computer program product of claim 13, wherein the program instructions stored on the one or more computer readable storage media further comprise:
program instructions to, in response to determining a probable failure, update metadata of the computing system with mapper objects and associating the mapper objects to a universally unique identifier of the computing system.

15. The computer program product of claim 14, wherein the program instructions stored on the one or more computer readable storage media further comprise:
program instructions to generate failure insights of machine learning models from received mapper objects of the computing system.

16. A computer system comprising:
one or more computer processors;
one or more computer readable storage media; and
program instructions stored on the one or more computer readable storage media for execution by at least one of the one or more computer processors, the program instructions comprising:
program instructions to receive a request for a machine learning model and information associated with decisions made by the machine learning model;
program instructions to determine one or more machine learning modules that satisfy the received request;
program instructions to create a dedicated traffic channel to send the determined one or more machine learning modules and information associated with the decisions made by the machine learning model; and
program instructions to transmit the determined one or more machine learning modules and information associated with decisions made by the machine learning model to a computing system using the created, dedicated traffic channel.

17. The computer system of claim 16, wherein the program instructions stored on the one or more computer readable storage media further comprise:
program instructions to collect data streams from a 5G telecommunications network comprising unstructured information from audio and video feeds; and
program instructions to translate the unstructured information to a 5G service readable format using serial and parallel classification techniques.

18. The computer system of claim 17, wherein the program instructions stored on the one or more computer readable storage media further comprise:
program instructions to transmitting instructions to the determined one or more machine learning models to process information associated with decisions made by the machine learning model and to process information stored locally by the computing system; and
program instructions to execute a decision based on information associated with decisions made by the machine learning model.

19. The computer system of claim 17, wherein the program instructions stored on the one or more computer readable storage media further comprise:
program instructions to update a database comprising one or more machine learning models, respective information associated with decisions made by each of the one or more machine learning models, and associated computing system architecture using at least one machine learning model of the one or more machine learning models using a 5G based MAC protocol or an out-of-band approach over shared bus communication message queue architecture of a 5G telecommunications network.

20. The computer system of claim 16, wherein the program instructions stored on the one or more computer readable storage media further comprise:
program instructions to validate machine learning decisions with local data of the computing system.

* * * * *